United States Patent
Tanzillo et al.

(10) Patent No.: US 8,458,073 B2
(45) Date of Patent: Jun. 4, 2013

(54) ENTERPRISE RISK ASSESSMENT MANAGER SYSTEM

(75) Inventors: Ken Tanzillo, Staten Island, NY (US); David R Allaway, Neshanic Station, NJ (US); DeVonne Salliey, Montclair, NJ (US); Thang Q Hoang, Hackettstown, NJ (US); Judith A Freeman, Bridgewater, NJ (US); Pamela Malene, Mechanicsburg, PA (US)

(73) Assignee: Dun & Bradstreet, Inc., Short Hills, NJ (US)

(*) Notice: Subject to any disclaimer, the term of this patent is extended or adjusted under 35 U.S.C. 154(b) by 259 days.

(21) Appl. No.: 10/726,023

(22) Filed: Dec. 2, 2003

(65) Prior Publication Data

US 2005/0119961 A1  Jun. 2, 2005

(51) Int. Cl.
  *G06Q 40/00* (2006.01)
(52) U.S. Cl.
  USPC ............. 705/36 R; 705/35; 705/37; 705/38
(58) Field of Classification Search
  USPC ........... 705/35, 36, 37, 38, 7, 8, 9, 10, 36 R
  See application file for complete search history.

(56) References Cited

U.S. PATENT DOCUMENTS

| | | | |
|---|---|---|---|
| 5,878,400 A * | 3/1999 | Carter, III | 705/20 |
| 6,088,686 A * | 7/2000 | Walker et al. | 705/38 |
| 6,311,169 B2 * | 10/2001 | Duhon | 705/38 |
| 6,330,546 B1 * | 12/2001 | Gopinathan et al. | 705/35 |
| 6,405,181 B2 * | 6/2002 | Lent et al. | 705/38 |
| 6,456,983 B1 * | 9/2002 | Keyes et al. | 705/36 |
| 6,651,884 B2 * | 11/2003 | Prendergast et al. | 235/380 |
| 6,654,727 B2 * | 11/2003 | Tilton | 705/36 R |
| 6,658,393 B1 * | 12/2003 | Basch et al. | 705/38 |
| 6,783,065 B2 * | 8/2004 | Spitz et al. | 235/380 |
| 6,847,942 B1 * | 1/2005 | Land et al. | 705/30 |
| 6,850,643 B1 * | 2/2005 | Smith et al. | 382/173 |
| 7,006,992 B1 * | 2/2006 | Packwood | 705/38 |
| 7,206,768 B1 * | 4/2007 | deGroeve et al. | 705/54 |
| 2002/0065752 A1 * | 5/2002 | Lewis | 705/35 |
| 2003/0014290 A1 * | 1/2003 | McLean et al. | 705/7 |
| 2003/0061232 A1 * | 3/2003 | Patterson | 707/104.1 |
| 2004/0039619 A1 * | 2/2004 | Zarb | 705/7 |
| 2004/0111346 A1 * | 6/2004 | Macbeath et al. | 705/35 |
| 2004/0162742 A1 * | 8/2004 | Stoker et al. | 705/7 |
| 2004/0215551 A1 * | 10/2004 | Eder | 705/38 |
| 2004/0225629 A1 * | 11/2004 | Eder | 706/46 |
| 2004/0260634 A1 * | 12/2004 | King et al. | 705/35 |
| 2005/0262013 A1 * | 11/2005 | Guthner et al. | 705/38 |

\* cited by examiner

*Primary Examiner* — Nga B. Nguyen
(74) *Attorney, Agent, or Firm* — Ohlandt, Greeley, Ruggiero & Perle, L.L.P.

(57) ABSTRACT

A risk assessment manager is an intranet-based software system that provides enterprise-wide automated risk assessment and portfolio management to help companies reduce bad debt, decrease operational expenses, and increase cash flow. System features include integrating business information associated with unique business identifiers and displaying data in multiple languages and currency.

4 Claims, 18 Drawing Sheets

Credit Risk:                    Acceptable
Exception Rule Status:          Warning
Follow-Up Actions:              Required
RAM Score: 09/19/2001           3.19 ⎯⎯ 60
Credit Limit:         USD       0.00
Credit Remaining:     USD       N/A

| Credit Risk | Exception Rule | Follow-Up Actions | RAM Score | Credit Limit | Credit Status |
|---|---|---|---|---|---|

Scored On: 09/19/2001  Model: WITH FINANCIALS

| Comp | Attribute | Value | Weight | Score |
|---|---|---|---|---|
| Total Employees | 105 | 6 | 10 | 0.6 |
| Rating | 3A3 | 0 | 10 | 0 |
| Paydex - Current | 55 | 3 | 15 | 0.45 |
| Credit Score | 8 | 0.8 | 15 | 0.12 |
| Rating Code | FAIR | 4 | 10 | 0.4 |
| Net Sales (Financial) | 18569562 | 8 | 5 | 0.4 |
| Years In Business | N/A | N/A | [10] | |
| Current Ratio | 1.27 | 5 | 10 | 0.5 |
| Debt/Net Worth Ratio | 1.9 | 4 | 10 | 0.4 |
| Quick Ratio | 0.57 | 0 | 5 | 0 |
| Total: | | | 90.0 | 2.87 |

FIG. 6

Credit Analysis
SYS555, Gorman Manufacturing

Credit Risk: Acceptable
Exception Rule Status: Warning
Follow-Up Actions: Required
RAM Score: 09/19/2001  3.19
Credit Limit: USD 0.00
Credit Remaining: USD N/A

| Credit Risk | Exception Rule | Follow-Up Actions | Credit Limit | Credit Status |
|---|---|---|---|---|

| Col | Score | Date | Model |
|---|---|---|---|
| 1 | 3.19 | 09/19/2001 | WITH FINANCIALS |
| 2 | 3.86 | 09/29/2000 | WITH FINANCIALS |

Decision
Date:

FIG. 7

Customer Base Analysis
DTFltr

CBA Name: —900

Paydex by RAM Score

Analyze (rows)

Paydex - Current   —902

By (columns)

RAM Score of Account   —904

Statistic to track

NONE

Go

Tabulation
◉ Count
○ Sum of
○ Average Of

Criteria
◉ Normal
○ Percent Of:   Total ▸

ACCOUNT INFORMATION

- eRAM Summary Page
- D&B Data
- Customer Data
- Principal Data
- Credit Analysis
- Financial Statements
- Documents
- Note To Do's
- ALL NOTES AND TO DO'S
- ALERT ITEMS
- CUSTOMER BASE ANALYSIS
- RAM SCORE THRESHOLDS
- ACCOUNT PROFILES
- DAYS SALES OUTSTANDING
- FILTERS

| | | |
|---|---|---|
| City / Town: | San Francisco | |
| State/Province/Region | CA | |
| Zip/Postal Code: | 94110 | |
| Telephone | 999-555-1234 | Fax: 999-555-4321 |
| Contact: | Mr. Henry Gorman | |
| D-U-N-S Number: | 00007743 | |

| | |
|---|---|
| Order Amount: | $5000 |
| Account Type: | Regular |
| Selling Terms: | 30 days |

Principal 1     Principal 2

- *First Name:
- MiddleInitial:
- *Last Name:
- Name Suffix:
- *Current Street Address
- *City:
- *State/Province:
- *ZIP/Postal Code:
- *Social Security Number
- Birthdate: mm/dd/yyyy
- *Required Fields for Small Business Risk New Account Score

ENTERPRISE RISK ASSESSMENT MANAGER SYSTEM

BACKGROUND OF THE INVENTION

1. Field of the Invention

The present disclosure generally relates to automated credit decisioning and portfolio management. In particular, the present disclosure relates to managing and analyzing portfolios of accounts to help companies reduce bad debt, decrease operational expenses, and increase cash flow.

2. Background of the Invention

Chief financial officers (CFOs), treasurers, and controllers need to increase revenues, while minimizing overall risk, including credit risk. They need to improve cash flow (order-to-cash cycle), reduce operational expenses (do more with existing resources), and improve the efficiency and productivity of credit systems (faster turnaround time on accounts and orders). Also, they need to reduce bad debts and have better reporting. According to the Financial Executive International October 2002 Survey of Senior Finance Executives, most financial executives want more than just operational support from credit functions and accounts approved in less than one day. They are concerned about credit management staff failing to see the big picture, system shortcomings, a lack of a centralized data repository, and lack of time prohibiting prioritization. They want enhanced reporting, less administration, and exception-only analysis.

Credit managers determine and extend appropriate credit terms, assess credit worthiness, find and use appropriate, accurate, and reliable data, manage bad debt, reduce days sales outstanding (DSO), and justify decisions. The Credit Research Foundation Fourth Quarter 2002 Survey of Credit Manager Challenges revealed credit mangers want to improve DSO, improve overall portfolio management, do more with existing resources, reduce bad debt, and have faster turnaround times on accounts and orders.

There is a need to increase operating cash flow through a reduction in delinquency rates, increase profitability through reduction in bad debt write-downs, and increase operating margins through operational expense reductions. There is a need to decrease total risk exposure, charge-offs, problem accounts, and operational expenses for credit and collections. There is a need to increase utilization of existing information systems and assets. There is a need to decrease infrastructure costs. There is a need for consistency in risk analysis.

According to Bankruptcy Data Communications, there were 176 public company bankruptcy filings in 2000, 257 in 2001, and 191 in 2002. Five of the ten largest bankruptcies in history occurred in 2002. Capital tied up in DSO is over 50% greater than most companies have available in cash and short-term investments. This is $440 billion for the S&P industrials and if the average S&P Co. reduced DSO by 1 day, it would free up $31 million, according to Monitor Group, September 2002.

SUMMARY OF THE INVENTION

The present disclosure is directed to enterprise risk assessment manager systems and methods that satisfy these and other needs.

One aspect is a system that provides an enterprise risk assessment manager service comprising a user interface, a risk assessment manager, a data integration toolkit, and a corporate linkage component. The user interface receives requests and customer account information to store in a portfolio in a first database. The risk assessment manager provides application functions and services based on the requests. The data integration toolkit component provides access to at least a second database. The corporate linkage component provides information used in determining a total risk exposure for a customer in the portfolio.

In some embodiments, the risk assessment manager also includes a scoring component to provide a risk score for a customer in the portfolio and a transfer component to import and export data to and from the first database. In some embodiments, the data integration toolkit enhances the customer account information, provides entity matching for the customer account information, and provides data products.

Another aspect is a system that provides an enterprise risk assessment manager service comprising a portfolio analysis component and a common decisioning component. The portfolio analysis component analyzes a portfolio of customer accounts and provides a data product containing a financial profile of a customer in the portfolio. The common decisioning component provides a credit decision for the customer in the portfolio based on user-defined rules and polices.

In some embodiments, the common decisioning component includes a setup component to receive the user-defined rules and policies. In some embodiments, the system includes a configuration console component to provide administrative functions and security. The administrative functions includes an import function, an export function, and a calculate scores function. In some embodiments, the system includes a country logic component to determine a base language and a base currency for the customer in the portfolio. In some embodiments, the system also includes a database access component to retrieve country-specific data from a plurality of systems, such as European Office System, Canada Bilingual Office System, United States Advanced Office Systems, Nordic, Asian Pacific Latin America, and others.

Another aspect is a machine-readable medium having instructions stored therein for performing a method of providing an enterprise risk assessment manager service. The machine-readable medium is any software delivery mechanism, such as a website, a CD, or a floppy disk. Customer account information is received. A portfolio is created based on the customer account information by applying entity matching, applying unique corporate identifiers, applying corporate linkage information, and applying predictive indicators. A customer base analysis of the portfolio is provided. A risk score is provided for at least one customer in the portfolio. An account profile is provided for the customer. In some embodiments, financial data about the portfolio is provided in a selected currency. In some embodiments, days sales outstanding (DSO) information is provided for the customer in the portfolio. In some embodiments, the account profile includes a financial statement.

Another aspect is a method of providing an enterprise risk assessment manager service. Data in a portfolio of customer accounts is enhanced by a quality assurance process. At least one user-defined policy is received and enforced. Automated credit decisioning is provided for the customer based on at least one user-defined rule and the user-defined policy. Days sales outstanding (DSO) information is provided for the customer in the portfolio. Risk information is provided for the customer in the portfolio.

In some embodiments, the portfolio is segmented by a selected variable to uncover risks and opportunities in the portfolio. In some embodiments, the risk information includes a total risk exposure within a corporate entity associated with the customer. In some embodiments, the quality assurance process includes entity matching, applying unique corporate identifiers, applying corporate linkage information, and applying predictive indicators. In some embodiments, a financial profile of a customer in the portfolio is provided. The financial profile includes how the customer pays other companies and a financial statement for the customer.

In some embodiments, a change in a financial statement is received for the customer. A risk change is assessed in the portfolio based on the change in the financial policy according to the at least one user-defined rule and at least one user-defined policy. In some embodiments, the policy is selected from the group consisting of: a credit limit policy, a score policy, an exception policy, a collection policy, a selling term policy, and a financial selection policy. In some embodiments, a currency conversion feature is provided. A local currency is provided for each customer in the portfolio and a default currency is assigned for each customer in the portfolio.

BRIEF DESCRIPTION OF THE DRAWINGS

These and other features, aspects, and advantages of the present disclosure will become better understood with reference to the following description, appended claims, and drawings where:

FIG. 6 is a screenshot of an example user interface for providing risk score information;

FIG. 7 is a screenshot of another example user interface for providing risk score information;

FIG. 9 is a screenshot of an example user interface for customer base analysis;

FIG. 10 is a screenshot of an example user interface for ordering a small business risk score;

FIGS. 14-17 are screenshots of example user interfaces for configuring currency conversion.

DETAILED DESCRIPTION OF THE PREFERRED EMBODIMENTS

Figure 1:
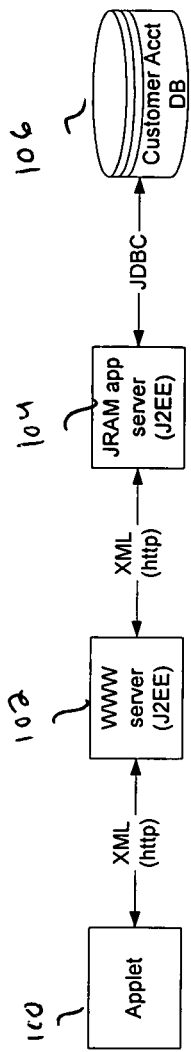
FIG. 1 is a block diagram of an example system architecture for an enterprise risk assessment manger (eRAM) system.

FIG. 1 shows an example user interface for one embodiment of an eRAM system. The eRAM system includes an applet 100, a server 102, an application server 104, and a customer account database 106. In this example, the eRAM system is Java 2 Platform, Enterprise Edition (J2EE) compatible, cross-platform, cross-database, internationalized, and supports hundreds of concurrent users accessing databases containing millions of accounts. Other embodiments are implemented using various platforms, processors, servers, operating systems, database systems, and other technologies. Applet 100 is a Java applet that sends and receives extensible markup language (XML) and hypertext markup language (HTML) data to and from server 102. Server 102 sends and receives XML and HTML data to and from application server 104. Application server 104 has a java database connectivity (JDBC) interface with customer account database 106.

Figure 2:
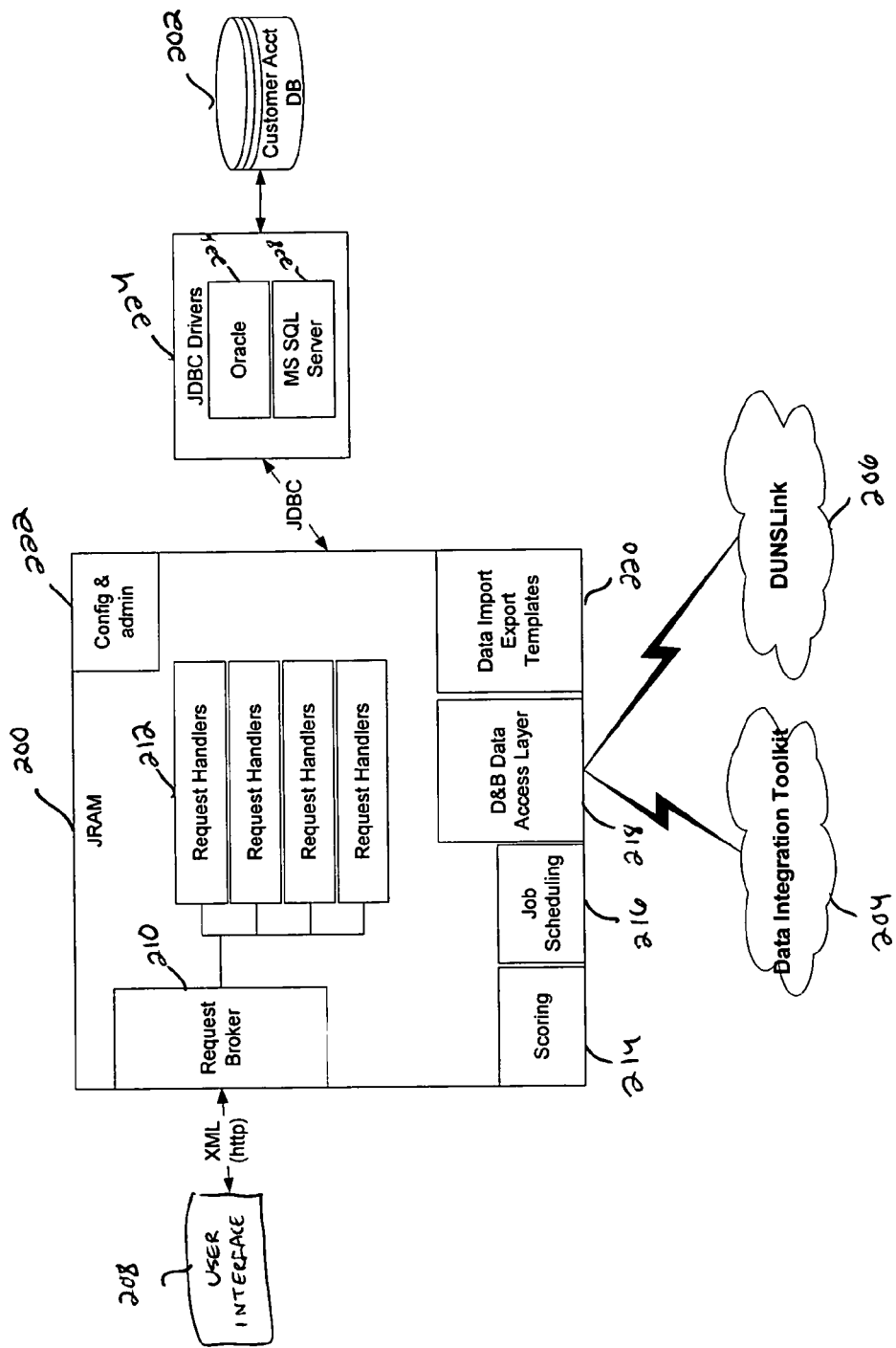
FIG. 2 is a block diagram of an example system architecture for components in an eRAM system.

FIG. 2 shows an example system architecture for components in one embodiment of the eRAM system. In this example, java risk assessment manager (JRAM) 200 provides application functions and services for the eRAM system. Inputs to JRAM are customer information, which resides on a customer account database 202, information from a data integration toolkit 204 and a DUNSLink™ 206, information input by a user interface 208. Data integration toolkit 204 provides the eRAM system with the following functionality: database access, matching, and data products. User requests for functions come through user interface 208 and are fielded by a request broker 210. Request handlers 212 handle various types of requests and use shared services. Shared services include scoring 214, job scheduling 216, and data access layer 218. Scoring 214 provides various business scores. Job scheduling 216 manages batch functions. Data access layer 218 provides access to data integration toolkit 204 and DUNSLink™ 206. Users use data import and export templates 220 to import and export data from their own applications to and from the risk assessment management system. Configuration and administration 222 is a shared service used by administrators to define configurations and users and their entitlements. Java database connectivity (JDBC) 224 is an application program interface (API) for connecting JRAM 200 to customer account database 202. JDBC 224 includes access to Oracle 226 and Microsoft SQL servers 228.

Figure 3:
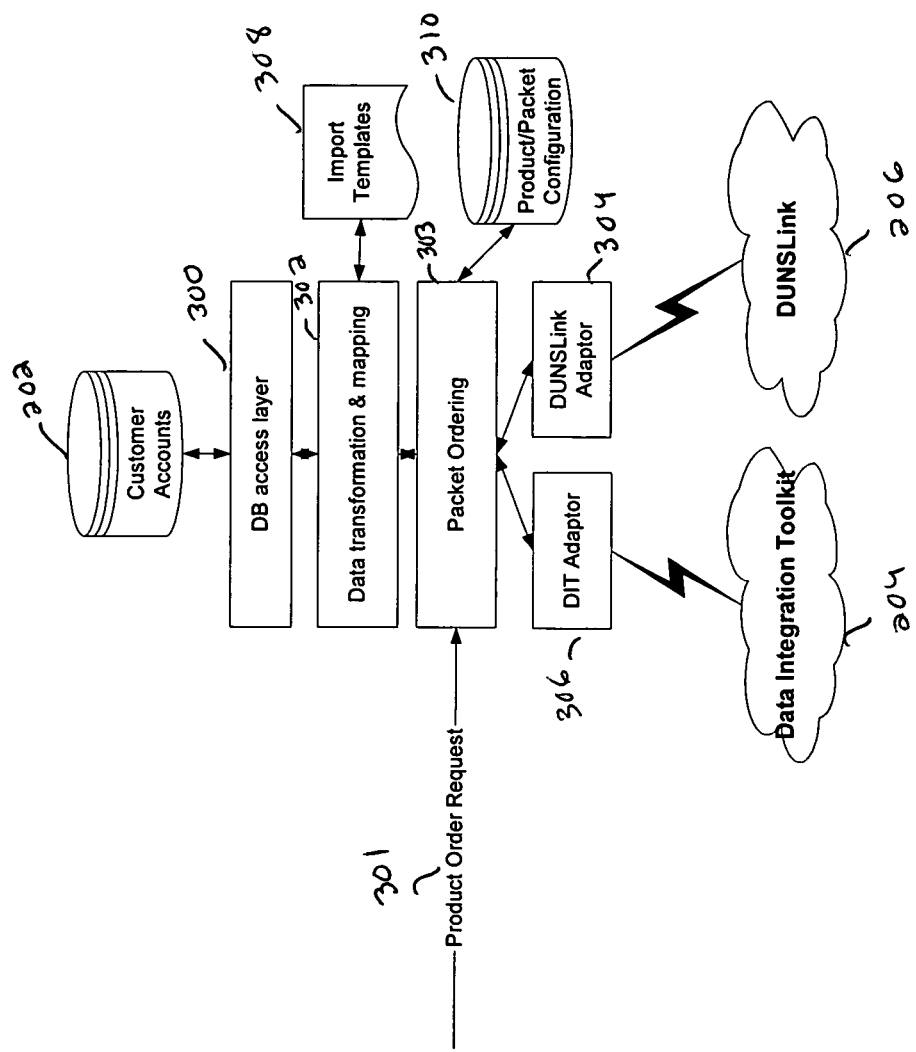
FIG. 3 is a block diagram of an example system architecture for an application server in an eRAM system.

FIG. 3 shows more detail for the data access layer 218 shown in FIG. 2. This illustrates how a customer enhances customer information in customer account database 202 by, for example, retrieving more current information. To retrieve a packet needed by a data transformation and mapping component 302 for a particular account in a product order request 301 that is not resident on customer accounts 202, access is through either a packet ordering component 303 from a DUNSLink™ adaptor 304, if it is United States information, or a data integration toolkit (DIT) adaptor 306, if it is international information. A product order request is for a data product, such as a business information report or scoring information. The packet is retrieved from a central location and then transferred back to the customer's location. Before the packet is transferred and stored in the customer's database, certain elements in the packet are transformed according to the product desired by data transformation and mapping component 302, which may access import templates 308.

Figure 4:
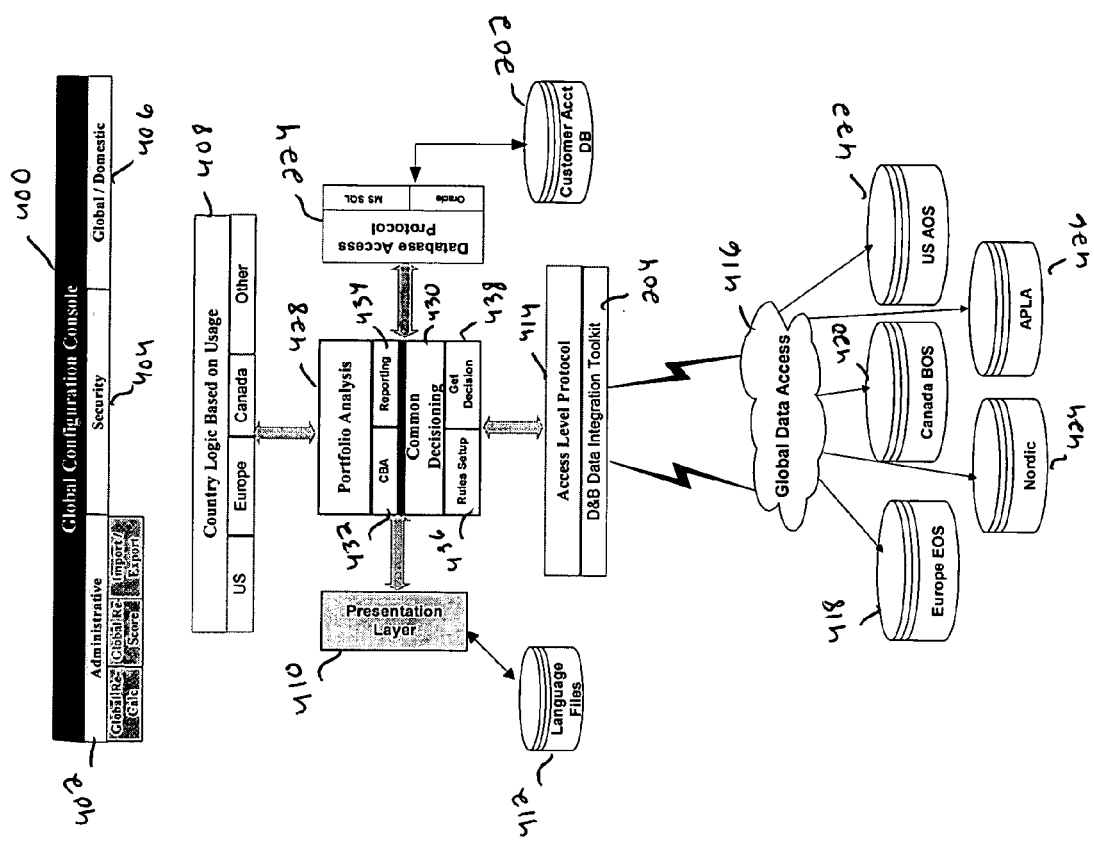
FIG. 4 is a block diagram of an example system architecture for a data access layer in an eRAM system.

FIG. 4 shows an example system architecture for the application server. A global configuration console 400 includes a number of configuration files. When a risk assessment management system is installed and initialized, various administrative 402, security 404, and global or domestic 406 features are configured. A country logic component 408 determines the nationality of the customer, U.S., Europe, Canada, and other nationalities and then determines the base language and currency for displays. For example, a baseline currency in a database for a customer in England is pounds or for a customer in France is francs or Euros. Presentation layer 410 uses language files 412 to convert data to the baseline currency and language before presenting it to the customer. Access level protocol 414 interfaces with data integration toolkit 204, which interfaces with global data access 416. Global data access 416 retrieves country-specific data from various systems, such as European Office System (EOS) 418, Canada Bilingual Office System (BOS) 420, US Advanced Office System (AOS) 422, Nordic 424, Asian Pacific Latin America (APLA) 426, and others. Other systems include D&B's worldwide information sources and third-party data providers available through the data integration toolkit service, such as Fair Isaac & Co.

In this example, the eRAM system includes portfolio analysis 428 and common decisioning 430. Portfolio analysis 428 includes customer-based analysis (CBA) 432 and reporting 434 of CBA. Portfolio analysis 428 examines a number of accounts and assess a risk level based on policies or rules. Rules are based on predictive scores from statistical models. A policy is established by customers to adjust the rules for certain cases. For example, rules about slow payment are interpreted differently for small businesses and large multinational businesses under a policy for determining credit risk. Portfolio analysis 428 is performed in conjunction with common decisioning 430. Common decisioning 430 includes rules setup 436 and get decision 438. A user uses rules setup 436 to establish individual one-off rules for a particular account. For example, a user squares an account with the rules established by rules setup 436 and decides whether to extend credit with get decision 438.

Figure 5:
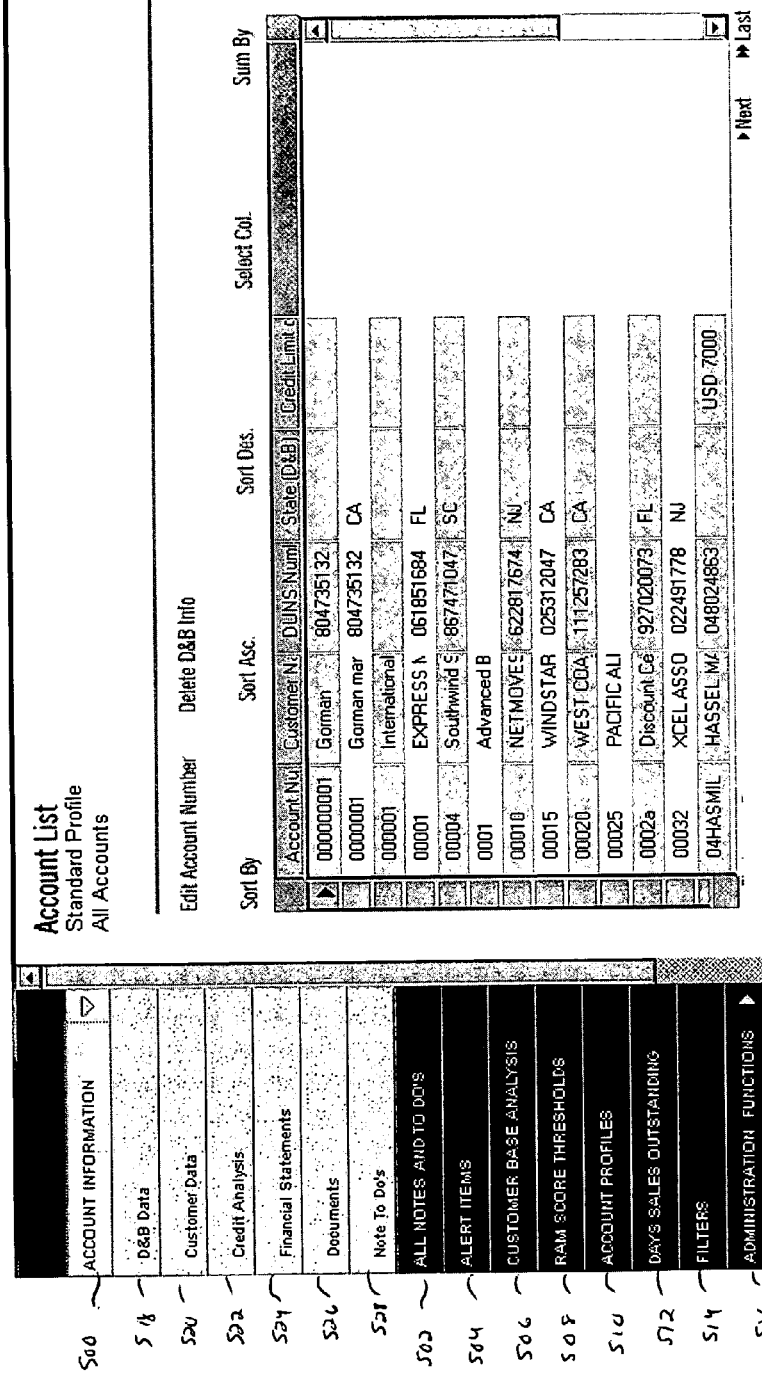
FIG. 5 is a screenshot of an example user interface for an eRAM system.

FIG. 5 shows a screenshot of an example user interface for one embodiment of the eRAM system. In this example, the main functions are account information 500, all notes and to do's 502, alert items 504, customer base analysis 506, RAM score thresholds 508, account profiles 510, days sales outstanding (DSO) 512, filters 514, and administrative functions 516. Account information 500 includes D&B data 518, customer data 520, credit analysis 522, financial statements 524, documents 526, and note to do's 528.

The eRAM system is an automated credit decisioning and portfolio management system that allows customers to decide with confidence. Globally, eRAM enables users to efficiently manage and analyze their entire portfolio of accounts, identify risks and uncover opportunities to grow the bottom line. It provides the flexibility to customize and automate decision-making rules across an entire enterprise. The eRAM system helps turn quality information into actionable decisions. Users can quickly process new customer applications and proactively manage exiting customer relationships.

The eRAM decisioning and portfolio management features allow users to strategically analyze their portfolio, gain access to information, establish consistent decisioning, automate credit decisions, and gain a macro picture. The eRAM system helps users: (1) improve cash flow; (2) manage total risk exposure; (3) decrease operating expenses; (4) enhance corporate governance; and (5) increase revenue.

A user's data is enhanced by additional data through a quality assurance process, called the DUNSRight™ process, which is available from Dun & Bradstreet Inc., Short Hills, N.J. Starting with a global data collection process, DUNSRight™ enhances the user's data through the application of an entity matching process, a unique corporate identifier called a DUNS Number, corporate linkage information, analytics and predictive indicators, and a global database, resulting in a comprehensive view of a user's financial profile, including how their customers pay other companies. With a consolidated database of enriched data, the user is able to automate credit decisions and segment the portfolio by any variable to uncover risks and opportunities within the user's customer base.

The eRAM system provides enabled processes and actionable information. Enabled processes include improved credit operations, consistent decisioning, and compliance with credit policies. The actionable information includes risk exposure, targeted collections, shifting risk, and hidden corporate links. Risk exposure is segmentable by variables, such as country. Targeted collections provide a better understanding of accounts receivable and improve DSO. Corporate linkage reveals the total risk exposure within a corporate entity. The results is better informed decisions and the ability to manage risk with confidence.

FIG. 6 shows an example user interface for providing risk score information. In this example, the user views risk score details from a tab on a credit analysis screen. FIG. 6 shows the result of automated analysis by the eRAM system. A resulting score 600 provides an overall calculation based on a current scoring model defined by user-defined score policies. A decision selection 602 allows the user to make a credit decision, such as accepted, declined, or pending.

FIG. 7 shows another example user interface with more information about the risk score details. In this example, current and past scores 700 and a graph 702 of historical performance of the account are shown. Graph 702 includes accept and reject score thresholds.

Figure 8:
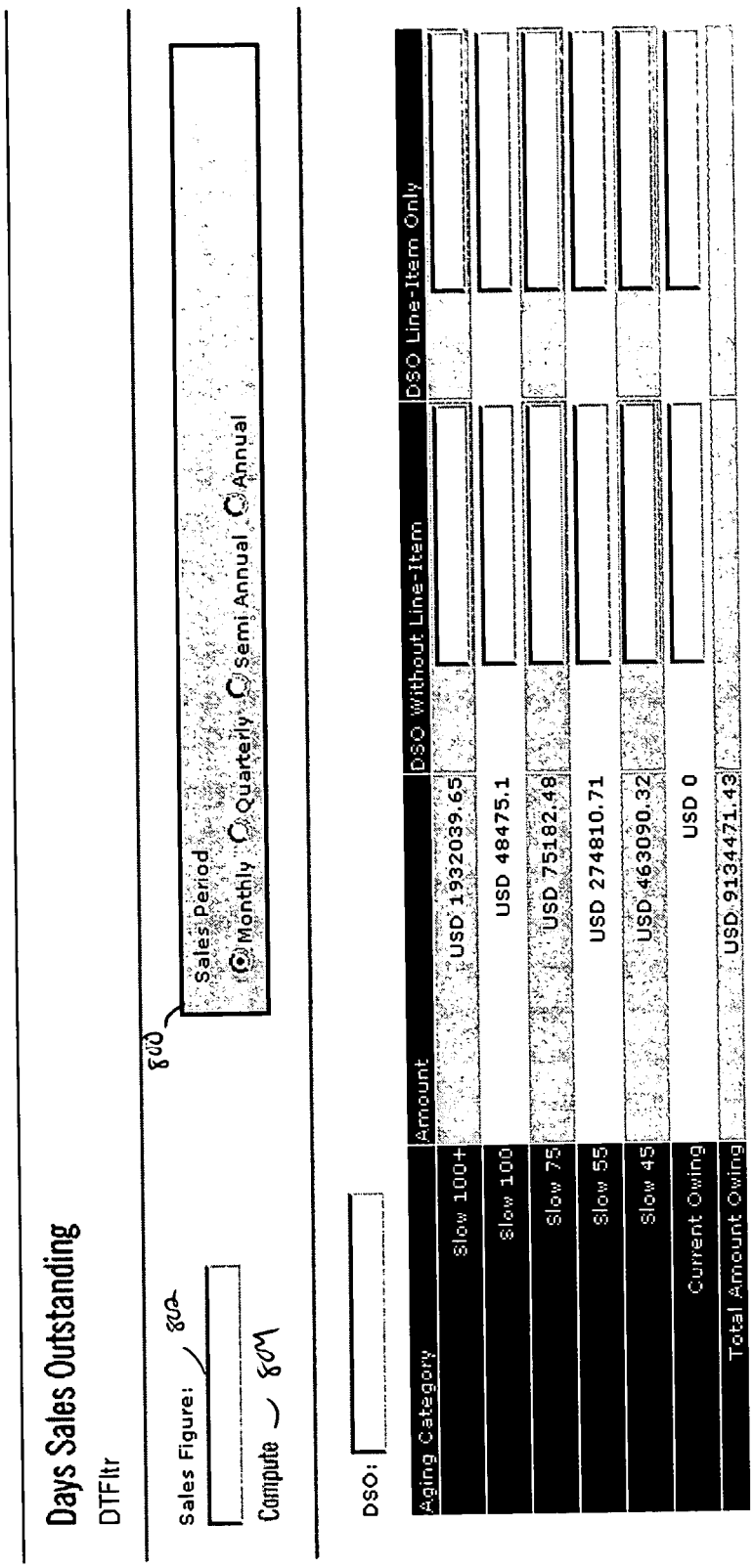
FIG. 8 is a screenshot of an example user interface for days sales outstanding (DSO) information.

FIG. 8 shows an example user interface for days sales outstanding (DSO) information. In this example, the DSO number for customer accounts is displayed. An average number of days to collect outstanding debt from customers is calculated when a sales period 800 is selected, a sales FIG. 802 is entered and the user clicks on compute 804. Daily sales projection—period sales projection/days in period, where days in period is 30 for monthly, 91 for quarterly, 182 for semi-annually, and 365 for annually. Days sales outstanding=total amount owning/daily sales projection. There are options to calculate DSO relative to an applied filter, and other features.

FIG. 9 shows an example user interface for customer base analysis. In this example, a user requests an analysis of customer accounts, such as a paydex by risk assessment manager (RAM) score 900 that analyzes current Paydex rows 902 for the RAM score of account column 904. After a user creates a customer base analysis, it is executed. There are options for printing, charting, editing, and filtering account data and other features.

FIG. 10 shows an example user interface for ordering a small business risk score. In this example, the eRAM system provides a risk score for small businesses based on D&B data, consumer data from Fair, Isaac, and data about the principal owners of the business from consumer credit reporting agencies.

Figure 11:
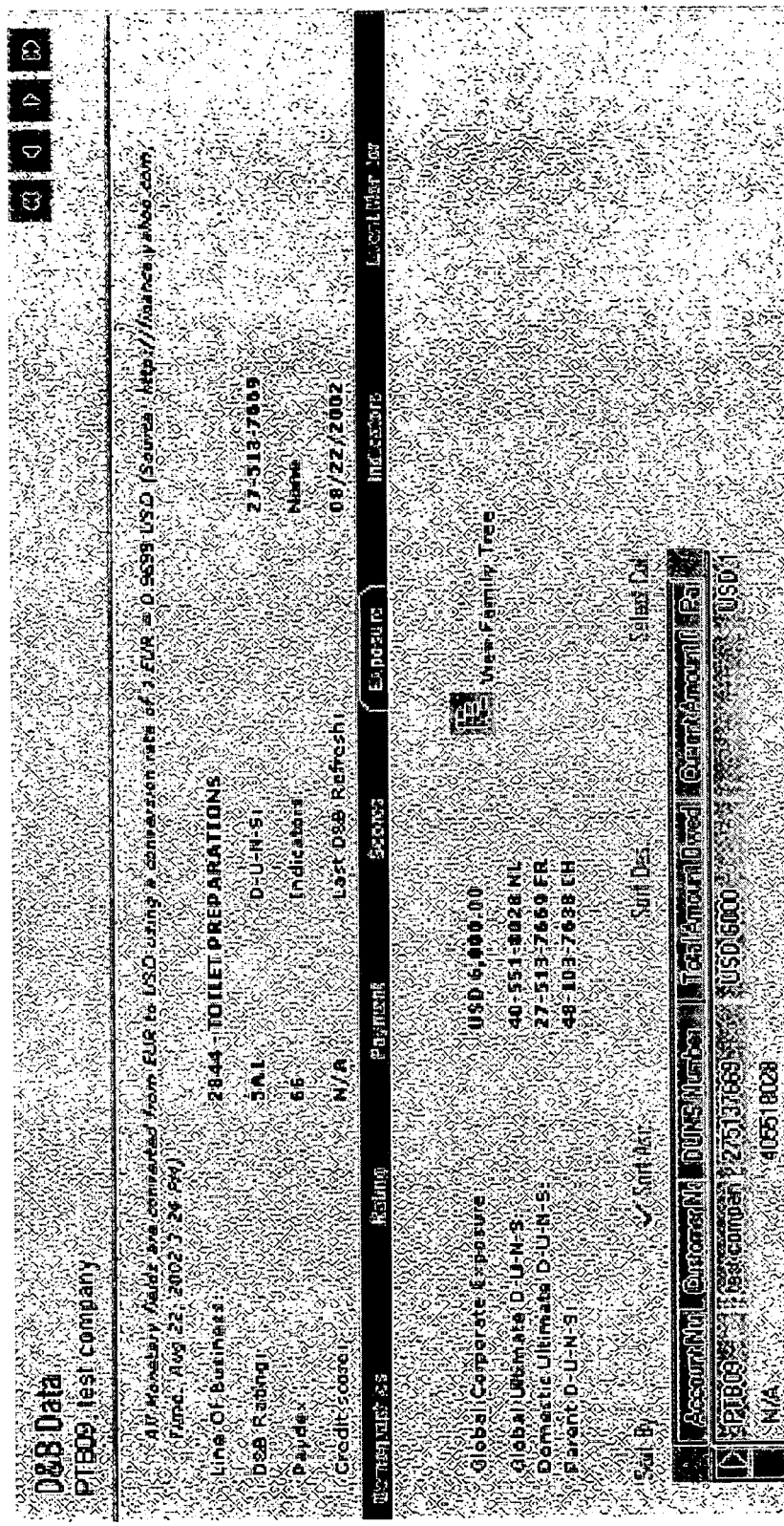
FIG. 11 is a screenshot of an example user interface for providing corporate risk exposure information.

FIG. 11 shows an example user interface for providing corporate risk exposure information. In this example, the eRAM system helps a user to link accounts together and shows a total investment in accounts receivable with a company and its related companies.

An example eRAM system, includes a transfer utility for importing and exporting data, currency globalization, financial statement features, and interfaces to various tools.

Figure 12:
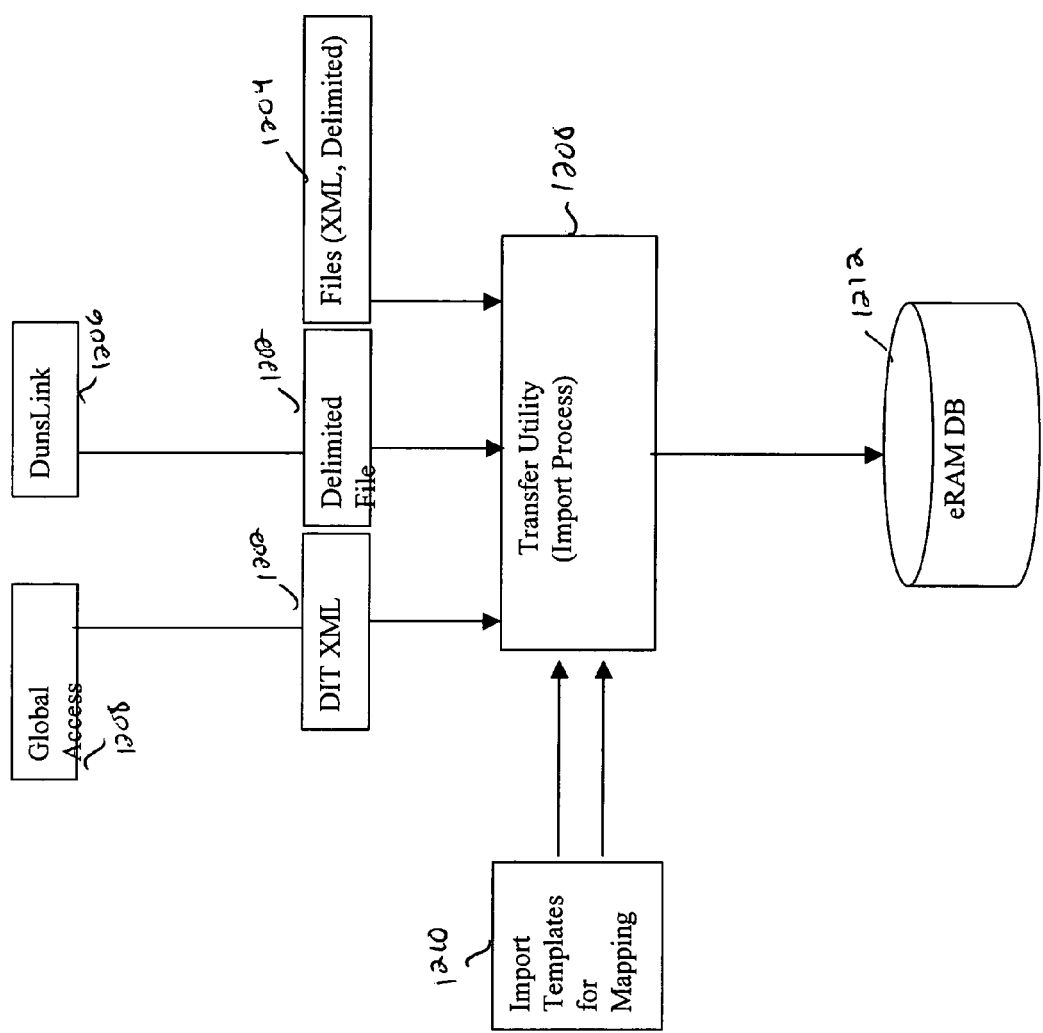
FIG. 12 is a block diagram of an example system architecture for an import feature.

FIG. 12 shows an example system architecture for an import feature. An import utility 1200 takes as input an import file 1202 or data packets 1204 from DUNSLink™ 1206 or Global Access™ 1208 and an import template file 1210. Then, imported data is stored in a database 1212. DUNSLink™ and Global Access™ are available from Dun & Bradstreet Inc., Short Hills, N.J.

Figure 13:
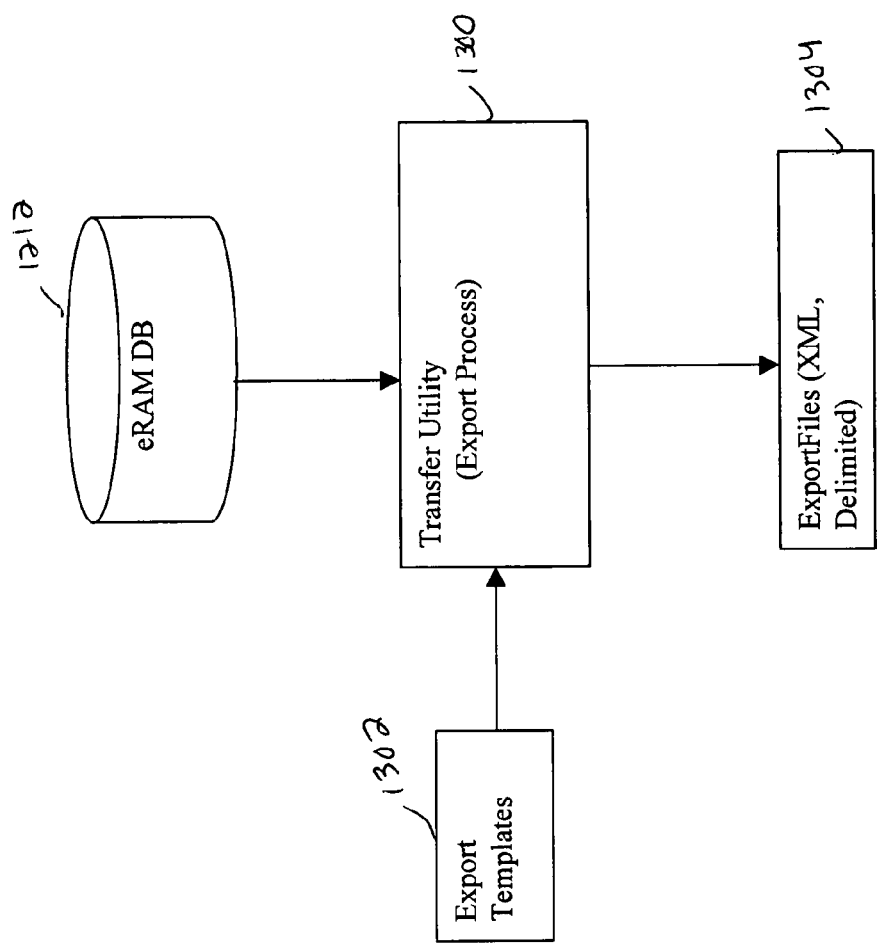
FIG. 13 is a block diagram of an example system architecture for an export feature.
Figure 14:
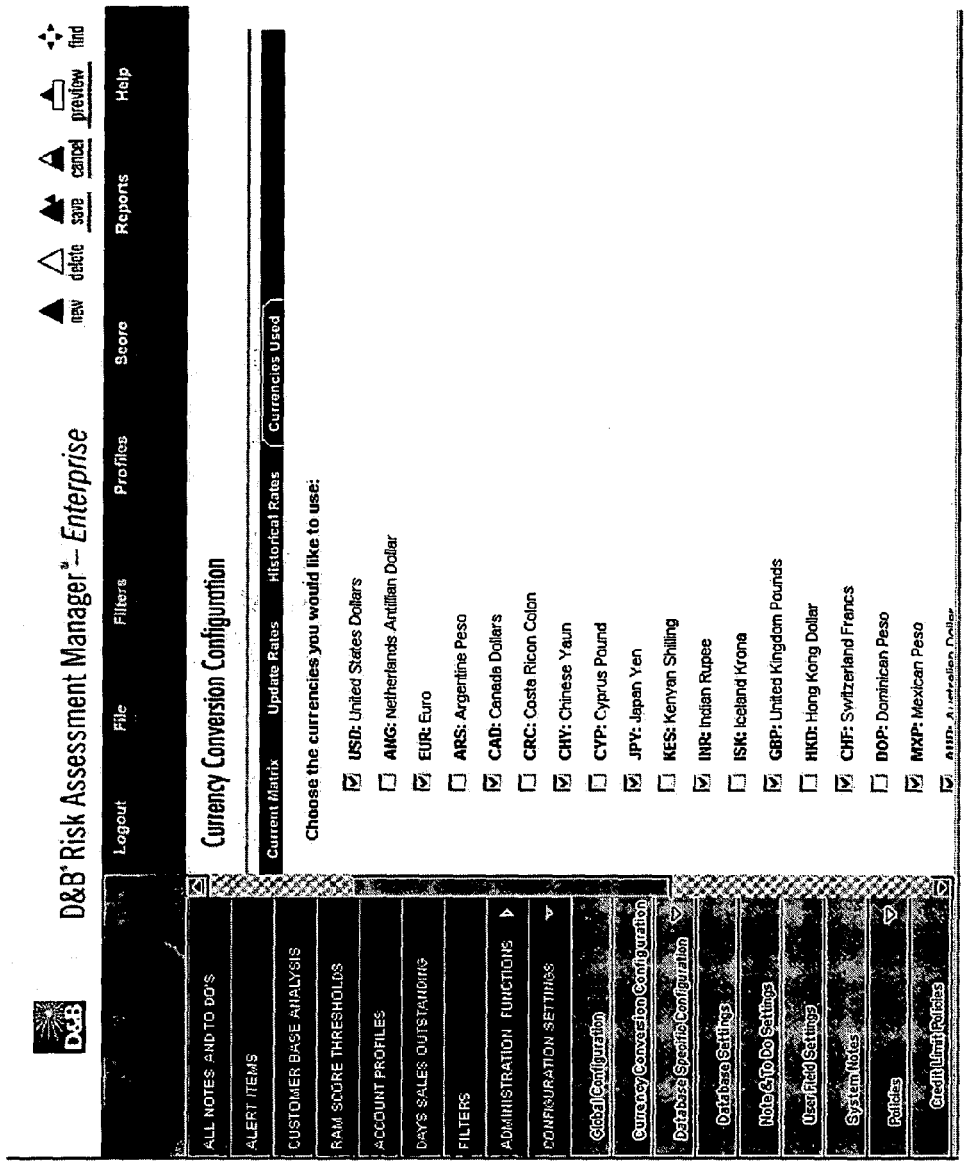

FIG. 13 shows an example system architecture for an export feature. A user extracts selected data 1304 in a predefined format from database 1212 through an export utility 1300. A user sets up templates 1302 that define various data sets to export.

Figure 15:
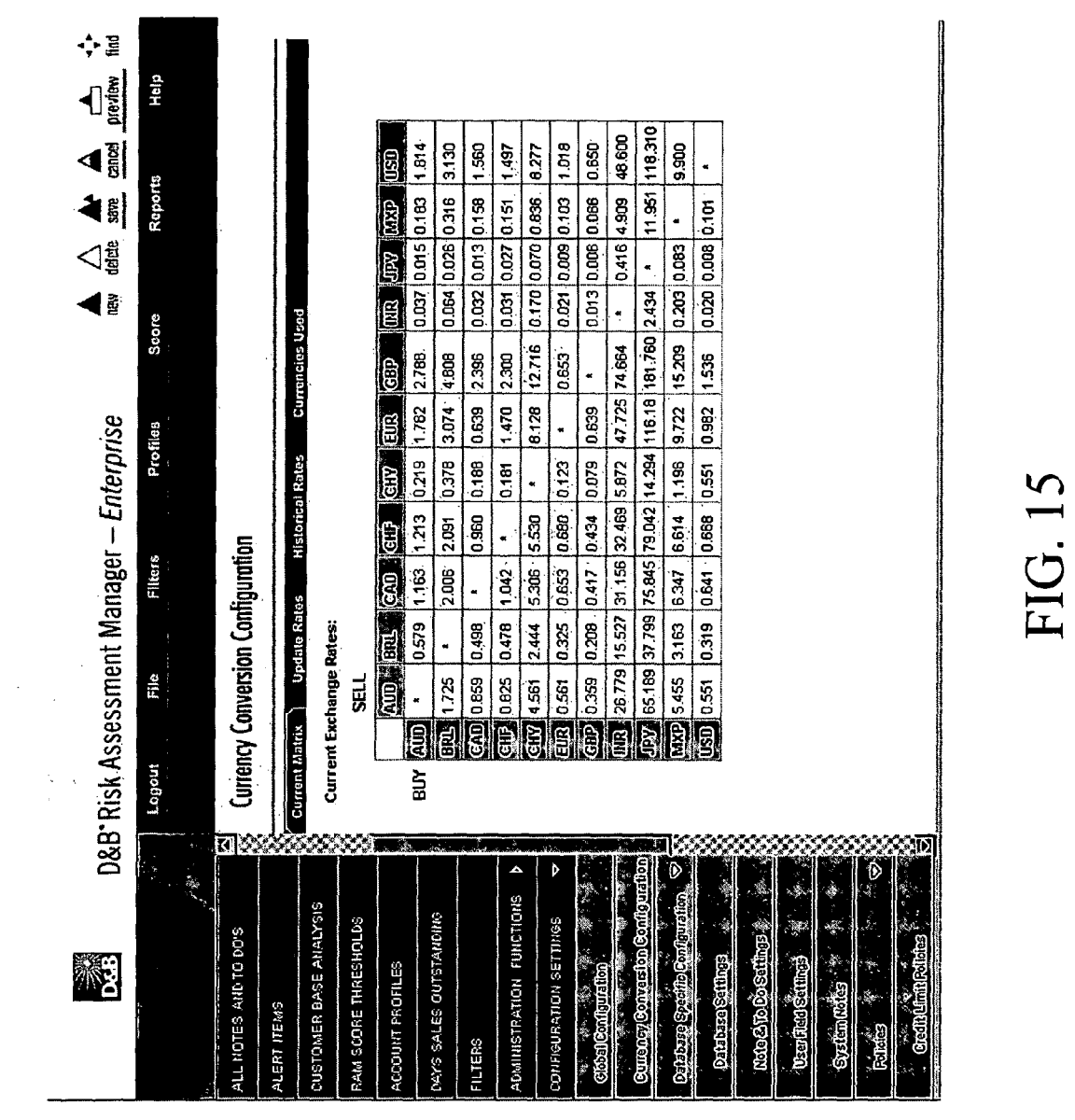
Figure 16:
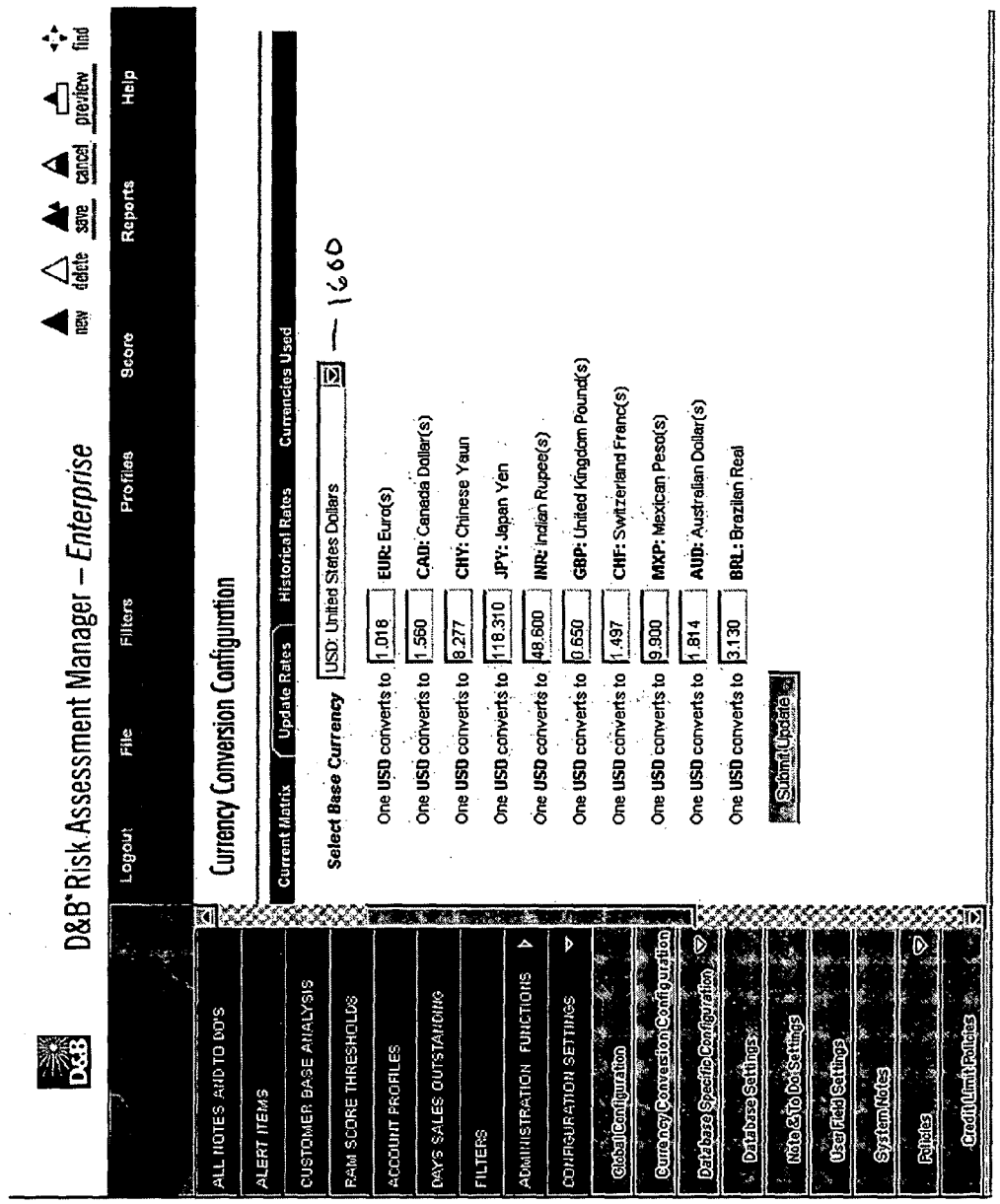
Figure 17:
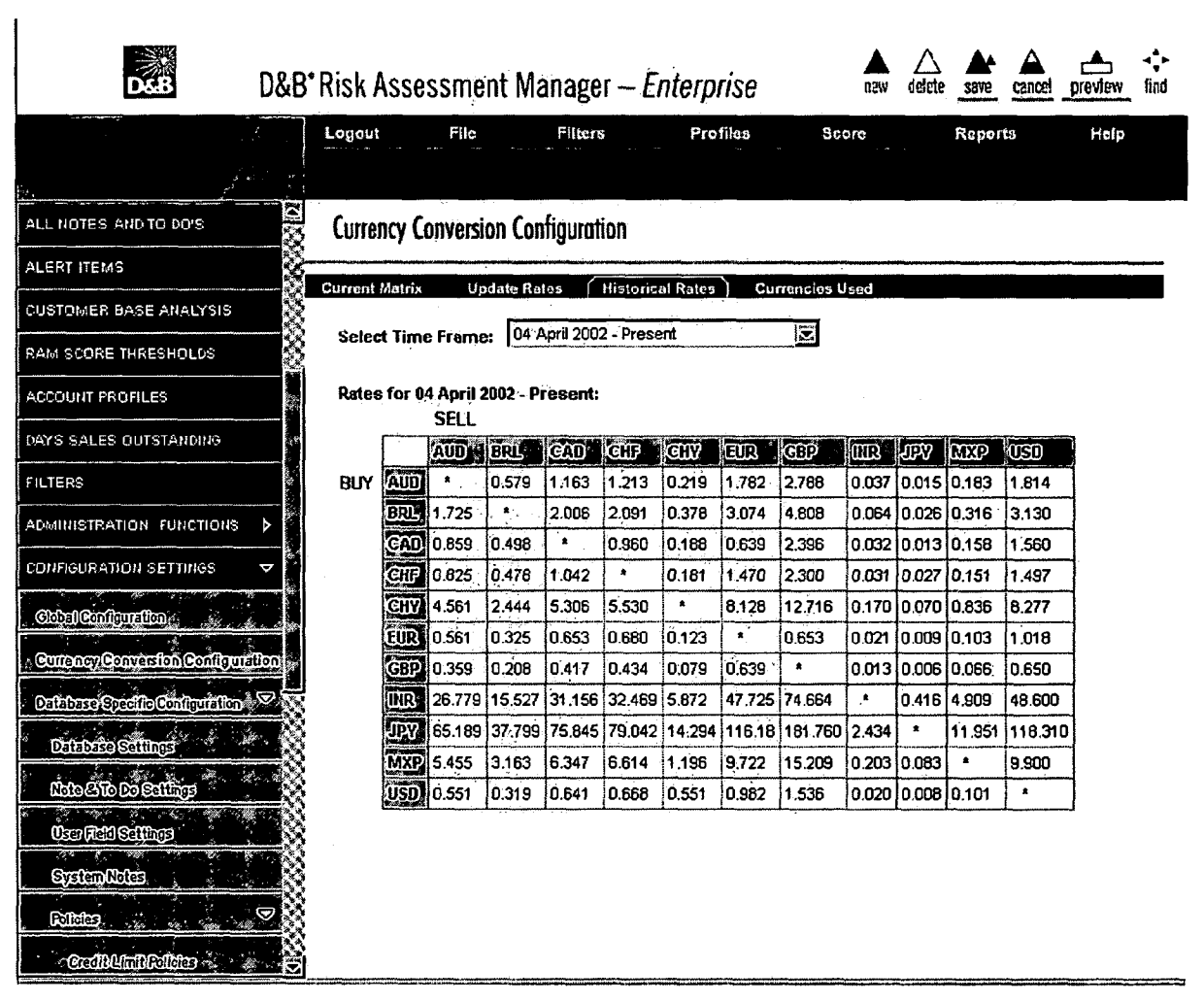

FIGS. 14-17 show example user interfaces for configuring currency conversion. In this example, the eRAM system has users at companies with operations in several countries, including multiple operations per company. To meet the needs of these users, currency globalization features are provided. Monetary values are stored in local currency for each account based on a default currency for the country. An administrator chooses a conversion rate for selected currencies. A data product is provided with a default currency. In FIG. 15, conversion rates are updated by an administrator. In FIG. 16, an administrator chooses a base currency 1600. All the conversion rates are then figured relative to the base currency. In FIG. 17, historical rates are set, which are used for audit and other purposes. In this example, currency rates are stored for the matrix for each conversion rate period.

In this example, each account has a defined currency code, which is used as the currency type for data associated with the account, including financial statements. New accounts are associated with a country and a currency. Each user is associated with a normal working currency and a user sets a preference whether to work in account-local or user-base currency where choices are offered. For example, a user chooses between account-local and user-base on user interface displays, such as financial statements.

Figure 18:
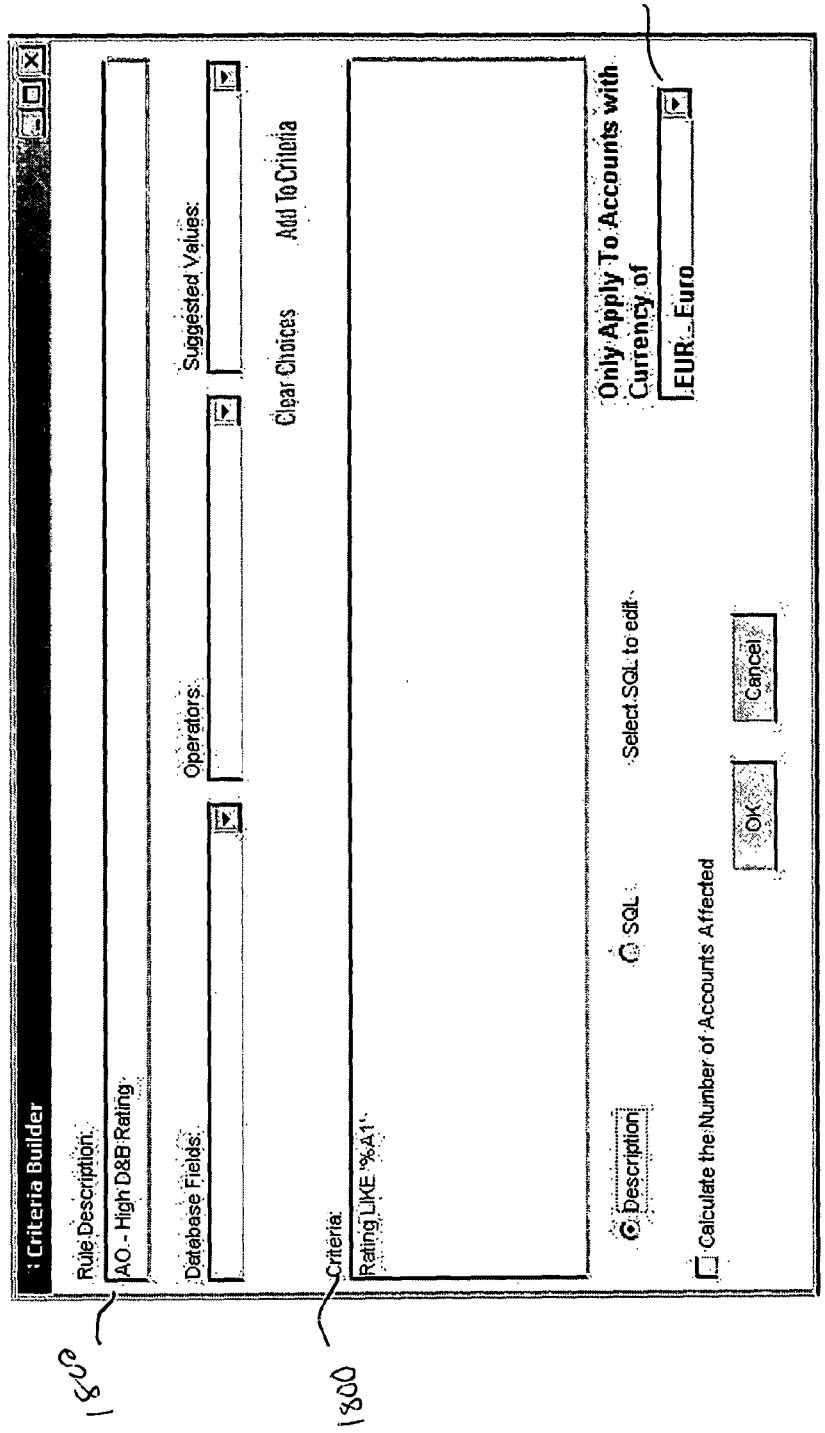
FIG. 18 is a screenshot of an example user interface for creating rules.

FIG. 18 shows an example user interface for creating rules. Users define policies, rules, criteria, filters, and expressions related to a portfolio of accounts. In FIG. 18, a user defines a criteria 1800 where ratings similar to '%A1' are given a rating of AO 1802 for accounts having a currency of Euro 1804. Criteria are used for filters, credit limit rules, score policy rules, exception policies, collection policy rules, and other features. Some examples of policies include a credit limit policy, a score policy, an exception policy, a collection policy, a selling term policy, and a financial selection policy.

An example embodiment of the risk assessment manager system provides many advantages. There is real-time decisioning, including integration of accounts receivable data into the decision-making process and order amount consolidation. There is an option of small business or traditional commercial decisioning. There is flexible integration with customer applications, including the ability to pull additional data products from a risk assessment manager system into a customer application. The risk assessment manager system incorporates information from decisioning and portfolio management systems. The system saves time to market and development costs. The system increases efficiency and productivity by moving data directly into workflow and systems. The system is flexible by controlling the data being imported. The system provides consistent data and decisions both locally and world-wide.

In addition, the example embodiment of the risk assessment manager system exports information for sharing with other applications. The system receives information from the user to use as part of the decision process. Business analysts are empowered to make quick decisions based on global risk policy that a user determines centrally. The system works together with other applications used by the user. The user automates its systems to enable its customers that are ordering online to obtain their own credit or risk approvals. The system includes code and transactions to build web-based interfaces to other applications.

It is to be understood that the above description is intended to be illustrative and not restrictive. Many other embodiments will be apparent to those of skill in the art upon reviewing the above description, such as adaptations of the present disclosure to integrate additional business systems, or other kinds of business information services. Various designs using hardware, software, and firmware are contemplated by the present disclosure, even though some minor elements would need to change to better support the environments common to such systems and methods. The present disclosure has applicability to various services, computer systems, and user interfaces beyond the example embodiments described. Therefore, the scope of the present disclosure should be determined with reference to the appended claims, along with the full scope of equivalents to which such claims are entitled.

What is claimed is:

1. A system for assessing risk, comprising:
 a processor; and
 a medium that contains instructions that when read by said processor, cause said processor to provide functions of:
 (a) a user interface to receive requests and customer account information to be stored in a portfolio in a first database;
 (b) a data integration component that matches a company in said portfolio to a DUNS number, and provides access to at least a second database;
 (c) a corporate linkage component that, based on said DUNS number, links said company to a related company in a family tree; and
 (d) a risk assessment manager that:
 provides application functions, services and portfolio analysis based on said requests;
 accesses said second database, via said data integration component, to obtain information about said related company; and
 determines a total investment in accounts receivable for said company and said related company, days sales outstanding for said company and said related company, and a total risk exposure based on said portfolio.

2. The system according to claim 1, wherein said risk assessment manager comprises:
 a scoring component that provides a risk score based on said portfolio.

3. The system according to claim 1, wherein said risk assessment manager comprises:
 a transfer component to import and export data to and from said first database.

4. The system of claim 1,
 wherein said information about said related company includes financial data presented in a first currency,
 wherein said medium also contains instructions that cause said processor to perform a function of a currency converter that converts said financial data presented in said first currency into financial data presented in a second currency, and wherein said risk assessment manager determines said total investment in accounts receivable in terms of said second currency.

* * * * *